(12) United States Patent
Lauper (10) Patent No.: US 8,571,529 B2
(45) Date of Patent: Oct. 29, 2013

(54) METHOD AND COMMUNICATION SYSTEM FOR CONTINUOUSLY RECORDING SOUNDING INFORMATION (75) Inventor: Eric Lauper, Bern (CH)

(73) Assignee: Swisscom AG, Bern (CH)

( * ) Notice: Subject to any disclaimer, the term of this patent is extended or adjusted under 35 U.S.C. 154(b) by 1096 days.

(21) Appl. No.: 11/848,519

(22) Filed: Aug. 31, 2007

(65) Prior Publication Data

US 2008/0057911 A1 Mar. 6, 2008

(30) Foreign Application Priority Data

Aug. 31, 2006 (CH) ........................................ 6119907
Aug. 31, 2006 (EP) ............................ 2006EP-119907

(51) Int. Cl.
*H04L 29/08* (2006.01)
*H04M 1/725* (2006.01)
*G08B 1/08* (2006.01)

(52) U.S. Cl.
USPC ...................... 455/414.4; 455/412.1; 455/574; 340/539.11; 340/539.17; 340/539.3

(58) Field of Classification Search
USPC .......... 455/412.1, 412.2, 414.1, 414.2, 414.4, 455/41.2, 572, 574; 340/539.1, 539.11, 340/539.13, 539.14, 539.16, 539.17, 539.3
See application file for complete search history.

(56) References Cited

U.S. PATENT DOCUMENTS

| | | | | |
|---|---|---|---|---|
| 6,021,325 A * | 2/2000 | Hall | ........................... | 455/412.1 |
| 6,510,208 B1 * | 1/2003 | Komiya | ....................... | 379/88.1 |
| 6,654,614 B2 * | 11/2003 | Morris et al. | ................. | 455/522 |
| 7,092,494 B1 * | 8/2006 | Anders et al. | .................... | 379/68 |
| 7,227,930 B1 * | 6/2007 | Othmer et al. | ................... | 379/85 |
| 7,342,489 B1 * | 3/2008 | Milinusic et al. | ............. | 340/506 |
| 7,392,058 B2 * | 6/2008 | Hirota et al. | ............... | 455/550.1 |
| 7,394,782 B2 * | 7/2008 | Davis | ............................ | 370/324 |
| 7,406,413 B2 * | 7/2008 | Geppert et al. | ............... | 704/235 |
| 7,505,911 B2 * | 3/2009 | Roth et al. | ..................... | 704/276 |
| 7,526,322 B2 * | 4/2009 | Whistler | ....................... | 455/566 |
| 7,894,849 B2 * | 2/2011 | Kass et al. | ................. | 455/550.1 |
| 8,042,034 B1 * | 10/2011 | Rajkumar | ...................... | 715/200 |
| 2001/0041559 A1 * | 11/2001 | Salabaschew | ................ | 455/412 |
| 2002/0108127 A1 * | 8/2002 | Lew et al. | ...................... | 725/142 |

(Continued)

FOREIGN PATENT DOCUMENTS

| | | |
|---|---|---|
| DE | 10344276 A1 | 5/2005 |
| EP | 1640879 A | 3/2006 |
| EP | 1725056 A1 * | 11/2006 |

OTHER PUBLICATIONS

Search report for application No. EP 06 11 9907.

*Primary Examiner* — Christopher M Brandt
(74) *Attorney, Agent, or Firm* — McAndrews, Held & Malloy, Ltd.

(57) ABSTRACT

A method is disclosed for continuously recording surrounding information by a mobile device (11). The mobile device (11) of a user (1) continuously records surrounding information such as surrounding noises or surrounding image data and at least one file (7) is generated from the recording and sent to a remote server (4). Said file or a file derived therefrom (7) is automatically subdivided and/or indexed automatically depending on the contents of the file (7) and/or on metadata ($M_1$, $M_2$, $M_3$) generated from external events ($e_1$, $e_2$, $e_3$) in relation to the mobile device (11) and/or by the user (1). Advantageously, the user (1) searches the subdivided and/or indexed file (7) so that he can easily retrieve the recorded information.

40 Claims, 1 Drawing Sheet

(56) References Cited

U.S. PATENT DOCUMENTS

| | | | |
|---|---|---|---|
| 2002/0160751 A1* | 10/2002 | Sun et al. | 455/412 |
| 2003/0012346 A1* | 1/2003 | Langhart et al. | 379/67.1 |
| 2003/0101156 A1* | 5/2003 | Newman | 707/1 |
| 2003/0123478 A1* | 7/2003 | Paiss | 370/466 |
| 2003/0220999 A1* | 11/2003 | Emerson | 709/224 |
| 2004/0075549 A1* | 4/2004 | Haller | 340/522 |
| 2004/0146272 A1 | 7/2004 | Kessel | |
| 2004/0268398 A1* | 12/2004 | Fano et al. | 725/88 |
| 2005/0059432 A1* | 3/2005 | Choi | 455/563 |
| 2005/0101334 A1* | 5/2005 | Brown et al. | 455/456.3 |
| 2005/0105712 A1* | 5/2005 | Williams et al. | 379/265.02 |
| 2005/0129186 A1* | 6/2005 | Dabush-Dorel et al. | 379/67.1 |
| 2005/0185936 A9* | 8/2005 | Lao et al. | 386/117 |
| 2005/0259958 A1* | 11/2005 | Johansson | 386/69 |
| 2005/0271352 A1* | 12/2005 | Yokouchi | 386/4 |
| 2006/0028400 A1* | 2/2006 | Lapstun et al. | 345/8 |
| 2006/0100002 A1* | 5/2006 | Luebke et al. | 455/574 |
| 2006/0181406 A1* | 8/2006 | Petite et al. | 340/521 |
| 2007/0014543 A1* | 1/2007 | Nakase et al. | 386/107 |
| 2007/0207782 A1* | 9/2007 | Tran | 455/414.1 |
| 2008/0036593 A1* | 2/2008 | Rose-Pehrsson et al. | 340/540 |
| 2008/0124055 A1* | 5/2008 | Shahraray et al. | 386/124 |
| 2008/0261585 A1* | 10/2008 | Souza | 455/423 |
| 2008/0285797 A1* | 11/2008 | Hammadou | 382/103 |
| 2008/0293397 A1* | 11/2008 | Gajdos et al. | 455/420 |

* cited by examiner

METHOD AND COMMUNICATION SYSTEM FOR CONTINUOUSLY RECORDING SOUNDING INFORMATION

REFERENCE DATA

This application claims priority from European patent application 2006EP-119907 of Aug. 31, 2006, the contents whereof are hereby incorporated.

TECHNICAL FIELD

The invention relates to a method for continuously recording surrounding information with a mobile device corresponding to the independent method claim and to a corresponding communication system.

BACKGROUND OF THE INVENTION

Japanese patent application JP-A-2002/330223 discloses the continuous recording of surrounding noises and the transmission thereof to a remote server. JP-A-2003/249981 discloses a local method for continuously recording surrounding noises, which in case of emergency can be replayed to a central unit with the time and exact position.

DE-A1-199 53 813 discloses an installation that consists of an access to a public communication network, an algorithm for voice recognition, a data processing unit, a database for storing data, a system clock as well as a terminal, and which processes telephone calls over a voice recognition algorithm in such a manner that person resp. line linked call protocols are established and stored. It is also possible to deliver a remote dictation. Simultaneously, a key-word search function of a normal text processing system is mentioned to allow the user to search a protocol thematically on conversation content.

US-A1-2005/0159959 discloses a central, network-based voice memo recorder having a voice recognition function, which records conversations and converts the voice message thus generated into a text message. The text message is made available to the user so that the latter receives a protocol of the conversation. The activation occurs over a special key, a menu or a voice command.

EP-A2-1 225 754 discloses a central server for voice messages, which discloses the storing from a GSM or internet terminal during a voice dialogue and comprises an automatic voice recognition and additional metadata, including time and emotions. It is however a disadvantage that these messages are stored as audio files and not as text.

DE-A1-103 30 799 discloses a device for storing memos. This can occur for example as a box hanging in a kitchen on the wall or as a mobile telephone. The embodiment includes a voice recognition program in order to convert the spoken contents into text. The converted text can be displayed, printed or forwarded as SMS or email. It is however a disadvantage that no central data storage and no searching possibilities are disclosed.

U.S. Pat. No. 6,029,063 discloses a net-based "voice scratchpad", especially for storing voice contents during a telephone connection or if the mobile telephone is in standby mode. U.S. Pat. No. 6,038,441 discloses the recording of a voice memo for use within a car with a local storage. It is also possible to store external incoming calls.

WO-A1-01/84815 discloses a net-based memo dictation device with a separate connection to the memo server. U.S. Pat. No. 6,671,353 discloses a local dictation device in the mobile telephone with a special key for recording voice data during a connection.

REPRESENTATION OF THE INVENTION

It is an aim of the invention to propose a method and a communication system that distinguish advantageously over the embodiments known in the prior art and that make continuously recorded surrounding information of a mobile device better searchable for the user at a later point in time.

It is a further aim of the invention to propose a method and a communication system that, for continuously recorded surrounding information of a mobile device, unburdens the mobile device by only making use of suitable wanted signals.

According to the invention, this aim is achieved with a method for continuously recorded surrounding information by a mobile device with the following method steps:

(a) the mobile device of a user continuously records surrounding information and sends the data to a remote server, (b) the data are classified and/or indexed automatically depending on the content of the data and/or on metadata that are generated from external events in relation to the mobile device and/or by the user, (c) the classified and/or indexed data are searched.

According to the invention, this aim is also achieved through a communication system and a mobile device with the characteristics of the independent device claims.

Since the metadata are stored together with the data, with the present invention, the user can advantageously the data or the files derived therefrom and easily find even events that occurred a long time ago. The very large and unstructured file that is generated in the case of a continuous recording is divided with the present invention into sections or sub-files that are meaningful for the user and that allow him to retrieve information more easily. Advantageously, the user can at a later stage edit and sub-divide the data or files and add metadata himself.

In a further preferred embodiment, it is useful that the mobile device switches to a sleep mode and does not make any recording, if no useful wanted signal (during the night or if there is a lot of noise) is received. In this manner, it is possible not only to reduce the power consumption of the mobile device but also to drastically reduce the quantity of data that is sent to the remote server and stored there. The mobile device however automatically starts recording if a meaningful audio or video signal is received.

These events can be recorded on the user's side in the mobile device or on the network's side in the mobile radio network or in the remote server. They can in principle be generated automatically, be preprogrammed and/or be preset individually by the user. The external events can include the location or movements of the mobile device. The date, time of day, start time or duration of a conversation can be such an event. Events within the mobile device are also suitable, such as data from sensors that are connected to the mobile device, recorded conversations or a special interlocutor of the user. The user's mood or state of mind can also be used as metadata. If voices of several persons are recognized, the system can also distinguish these persons from one another and store a corresponding indication as metadata. The user can also give the persons a name and the system can learn how the subscriber in question is called.

The surrounding information can preferably include noise data or image data.

Further advantageous embodiments are indicated in the dependent claims.

SHORT DESCRIPTION OF THE FIGURES

The invention will be described in more detail on the basis of the attached figures, where.

WAYS OF EXECUTING THE INVENTION

According to the invention, a method for continuously recording surrounding information through a mobile device 11 is disclosed. The recording part of the mobile device 11 of the user 1 is continuously switched on and records all surrounding information such as noise, conversations, telephone conversations, conferences etc. of the user through an integrated microphone. It is possible in another embodiment that such a device is fixedly installed in a conference room. The surrounding information can preferably include, besides noise data, also image data that are recorded through the mobile device 11 or a connected camera.

Figure 1:
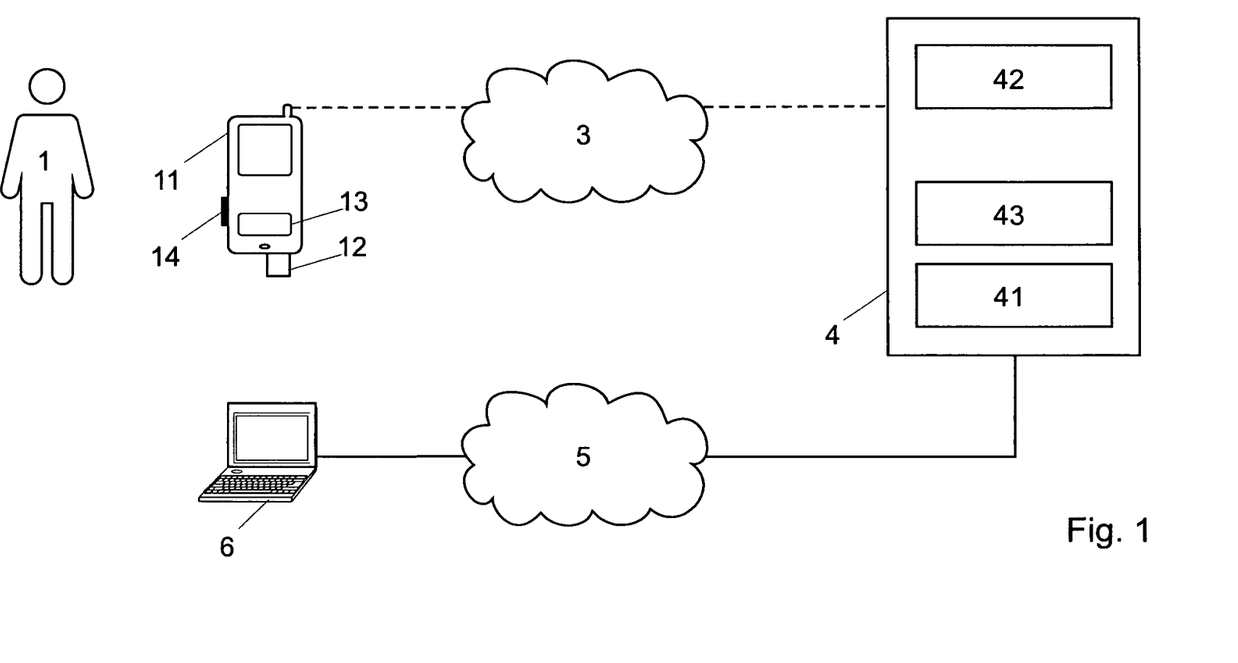
FIG. 1 shows a communication system corresponding to the present invention and FIG. 2 illustrates a recorded file marked, according to the invention, with metadata generated according to external events.

In the embodiment represented in FIG. 1, the user 1 is provided with a mobile telephone, a PDA or another portable mobile device 11 that is connected to a communication network 3, e.g. a mobile radio network. An identification module 12 is provided for identifying the mobile device 11 in the communication network 3, in the example indicated it is a SIM card for identification in a mobile radio network. Different mobile radio networks are known from the prior art, for example GSM, GPRS, HSCSD, EDGE, UMTS, CDMA network, W-LAN or IP network over which data can also be transmitted. Equivalent mobile radio networks can also be used in the frame of the invention.

On the network site, there is a remote server 4, which is for example operated by the operator of the mobile radio network 3 or by another service provider. It has a memory area 42 that is allocated to different users 1 and used by them. Each user, after a successful identification, can access his own part of the memory area 42 and his texts and data stored there or can store there his texts and data. The remote server 4 is also connected to said mobile radio network 3 or to said mobile radio network 3 over the Internet 5.

In order to access his memory area 42 and his data, or in order to store texts, or to search through stored data and texts, the user 1 must however in a first step be identified with the remote server 4. The identification with the remote server 4 can occur over said identification module 12 of the mobile device 11, over a caller identification (Caller-Line-Identification CLI), over biometric parameters (fingerprints, retina-scan, etc.) and/over a password. It is also known that the voice of the user 1 can be used as biometric parameter, when the user communicates with the system. In this manner, it is possible to differentiate between several users of a device or of an identification module, for example in a family or if several persons talk in a conversation. The identification of the user 1 can depend on the device used, as it is conceivable to offer the user further access to the remote server 4 and to his personal memory area 42. In the FIG. 1, the remote server 4 is connected additionally with the Internet 5 and with an Internet terminal 6. The user identification with the remote server 4 can thus depend on the device 11, 6 and, in one embodiment, is selected and set by the user 1 in the personal settings.

In a first step of the inventive method, all surrounding noises are continuously recorded by the mobile device 11 and a file 7 with all the recorded data is established. It is also conceivable for all the surrounding noises to be recorded, digitalized and compressed by the mobile device 11, to be streamed continuously over the network 3 to the remote server 4 and for the file 7 to be established there. The data transmission between the mobile device 11 and the remote server 4 occurs preferably over a permanently active IP connection, e.g. in a W-LAN, GPRS or UMTS network. A data transmission of individual files, for example as e-mails, IP packets, MMS etc. and/or over a switched network is however also possible.

A local buffering of the received signals or file parts in the memory of the mobile device 11 before transmission to the remote server 4 is also possible, for example if the mobile device is not connected to the network 3 or in order to avoid a permanent connection with the remote server. Periodical, for example hourly or daily, synchronization of the data between the buffer memory of the mobile device and the remote server is also conceivable.

The audio data can be compressed in the mobile device 11 in order to reduce the amount of data sent to the remote server. A conversion of the data into an MP3 format is for example possible. In case the conversion of the audio data into text described further below occurs in the mobile device and not in the network 3, it is possible to forgo the compression of the audio data; in this case, only the converted text is compressed.

An encryption of the transmitted audio, video and/or text data can also be provided in order to guarantee their confidentiality.

Signing the transmitted audio, video or text data through the mobile device 11 by means of a certificate can also be provided in order to guarantee their authenticity.

Simultaneously with the continuous recording, individual external events $e_1$, $e_2$, $e_3$ relating to the mobile device 11 and/or to the user 1 are recorded. These events $e_1$, $e_2$, $e_3$ are recorded on the user's side in the mobile device 11 or on the network side for example in the mobile radio network 3 or in the remote server 4 and possibly connected with the associated recording data. They can in principle be automatically generated, preprogrammed and/or predetermined individually by the user 1. The user 1 can indicate the events $e_1$, $e_2$, $e_3$ that he considers important for example in the user options when he logs in the memory area 42 allocated to him in the remote server 4. In another embodiment, the user 1 indicates the events $e_1$, $e_2$, $e_3$ in the mobile device 11. Since the mobile device 11 is continuously switched on and records all surrounding noises, the user 1 can generate such an event by pressing on a key and/or by a voice command, and possibly simultaneously enter or dictate a description of the event.

The external events $e_1$, $e_2$, $e_3$ can comprise the location or movements or changes of the location of the mobile device 11. The location can be determined through a GPS provided in the mobile device 11 or through signals in the mobile radio network 3. Movements can be recorded by movement sensors in the mobile device 11. The data, time of the day, starting time or duration of a conversation can also be such events $e_1$, $e_2$, $e_3$. Events within the mobile device 11 (receiving or sending SMS, MMS, list of the telephone conversations, log function of the mobile device, connections established over Bluetooth, recording of a picture, etc.) are also suitable, as are data from sensors 14 that are connected to the mobile device 11 (external temperature, gas concentration, pressure, pollen, etc.). It can also be recorded conversations (conferences, when shopping, at the kindergarten, etc.) or a special interlocutor of the user 1. The mood or state of mind of the user 1, possibly in combination with emotional characteristics such as stress, lies, etc. can additionally be associated with the text. If the voices of several persons are recognized (for example participants in a telephone conversation), the system can also distinguish these persons and store a corresponding indication ("participant A says:", "participant B replies:", etc.). The user can also name the persons and the system can learn how the corresponding participant is called. Or, conversely, it is possible that a person is no longer to be heard for a time or during a predetermined period, which is recorded as an event. If the recording is made over several microphones, the room characteristics resp. features in the room can be defined as an event.

On the other hand, the contents of the file can also lead to a subdivision or indexation. The system can, in this case, automatically analyze the spoken contents and classify it according to themes, e.g. in order to distinguish a conversation about football from a professional meeting and to mark and subdivide the data accordingly. Predefined noises such as honking of cars, alarm bells, aircraft noise, television jingles, jingles on the radio, etc. or from other devices in the vicinity (PDA, PC, television apparatus, radio, alarm clock, ringing of a mobile telephone etc.) can also be used as events.

Naturally, a combination of said events $e_1$, $e_2$, $e_3$ and/or of the contents of the file 7 (conversation with XY on 12.02. in Stuttgart about cars, Sunday morning at 08:00, etc.) within the frame of the invention.

According to the invention, metadata $M_1$, $M_2$, $M_3$ are generated from the external events $e_1$, $e_2$, $e_3$ and these metadata $M_1$, $M_2$, $M_3$ are associated to the generated file 7 temporally according to the external events $e_1$, $e_2$, $e_3$ or this file 7 is subdivided through the metadata $M_1$, $M_2$, $M_3$. These metadata $M_1$, $M_2$, $M_3$ are stored together with the file 7 and serve to allow the user 1 to better search the file 7. Thus, questions such as "Two years ago I spike with Mr. XY and he gave me some important information but I cannot remember what he said" or "It was the hottest day in the summer when I had an interesting conversation in Spain that I wish to listen to again" can easily be answered. The very large and unstructured file 7 that is generated during a continuous recording is thus subdivided in the present invention in sections or sub-files that are meaningful for the user and allow him to find again important information much more easily.

Figure 2:
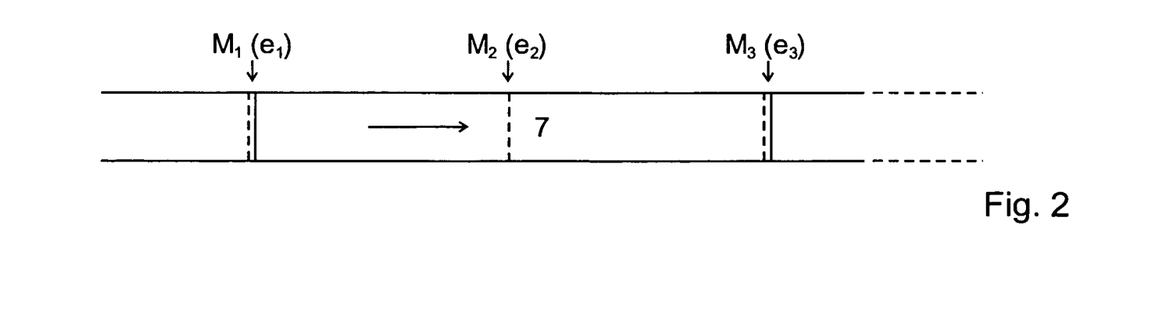

A diagrammatic view of the generated file 7 being associated to the metadata $M_1$, $M_2$, $M_3$ is represented in FIG. 2. In order to make the stored data searchable, a voice recognition system 13, 41 is provided either in the mobile device 11, in the remote server 4 or in another part of the mobile radio network 3, which analyses the recorded conversations and converts them into text. The text generated in this fashion is stored in the memory area 42 of the remote server 4 allocated to the user 1. It is visible that the text file corresponding to the voice file is provided with the metadata $M_1$, $M_2$, $M_3$ or the file is subdivided through these metadata $M_1$, $M_2$, $M_3$. The subdividing can also be performed in different files, with each file being connected to the corresponding metadata so that these are searchable according to the events.

The used voice recognition system 13, 41 can use user-dependent language models that have been previously generated and stored centrally. Since the user 1 is identified in any case, it is possible to use the stored, user-dependent language models. Through new conversations of the user 1, it is possible to simultaneously establish new language models for the user 1. By identifying the user and using speaker-dependent language models, one can advantageously increase the reliability of the voice recognition. The automatic recognition of the language allows simultaneously the use of the voice recognition system 13, 41 independently of the used language or dialect.

In another embodiment, the user 1 must install a Java-applet or another small program on his mobile device 11 before he can use the service. This program offers the user 1 a menu or a voice menu in order to reach the different functions of the service. The program also controls the continuous recording of all surrounding noises and automatically forwards them to the remote server 4. It can also comprise the already mentioned function <manually generating an event> by the user 1 by pressing on a key and/or by a voice command, as well as the later mentioned sleep mode.

Furthermore, it is also conceivable in a further embodiment to send and store in the memory area 42 of the remote server 4 further data available to the user or to his mobile device. Such data for example include copies of all sent or received SMS, MMS, e-mails, photos taken with the camera of the mobile device 11, the telephone directory of the user 1 in the mobile device 11 or also entries in a calendar in the mobile device 11. Reports on the activities of the mobile device (indications about incoming or outgoing calls, costs of these connections, connections established over Bluetooth, etc.) or data received by the mobile device 11 over an interface at close range (Bluetooth, infrared, etc.) can also easily be stored in the remote server 4. Messages stored for the user 1 in a personal network-based voice message box (voicemail) 43 can be stored in the remote server 4 or be copied to it. In FIG. 1, the network-based voice message box 43 is also located in the remote server 4. This is however not absolutely necessary and it can also be in any other part of the mobile radio network 3 or in the user device 11.

Since the user 1 can also connect over a computer 6 and the Internet 5 with the remote server 4, data generated or stored in the computer 6 can in principle be copied automatically or with the user's confirmation in the memory area 42. They can thus also be data (e-mails, address book, diary function etc.) of a mail program, general text documents, data from a VoIP service of the user 1 and/or data that have been produced during an Internet chat.

Additionally, video recordings can be made continuously by the mobile device 11 or by a device connected with the mobile device 11 and the data can also be sent to the remote server 4, subdivided and/or indexed. The external device can be a camera connected over Bluetooth or with other means (cable and USB, infrared, near field communication NFC etc.), a scanner or a Virtual Retinal display (VRD). It is thus possible to transmit not only what the user hears but also what he sees. The visual contents can also be analyzed and events generated for the subdividing/indexing on the basis of the contents.

In case the user 1 has an Eye Tracking System, his direction of viewing can be recorded and an image data recording device can record the image data corresponding to the direction of viewing and thus strongly reduce the data quantity. The recording of the surrounding noise can be occur according to the same principle for the direction of viewing, e.g. by means of an oriented directional microphone.

For storing all the texts and data, different possibilities are available within the frame of the invention. In a first embodiment, all the documents are converted to a searchable format, e.g. text, including XML or Voice XML, or as database format, in the mobile device or in the remote server and stored preferably with the, so that the information is easy to search. Simultaneously, the associated audio file *.wav, *.mp3 etc. that belongs with the text is stored in the memory area 42. The user 1 thus has the possibility of listening once again at a later stage, if needed, to the document. In a further embodiment, the associated audio file is stored only in the memory area if there are any doubts during the voice recognition as regards the correctness of the recognized text. Simultaneously, the metadata $M_1$, $M_2$, $M_3$ of said events $e_1$, $e_2$, $e_3$ are associated with the stored documents and stored with them.

The adjunction of a marked index in an audio file is also possible.

Individual files that have additionally been imported can be marked with a watermark, which makes the search for the document easier or can prove the origin or authenticity of the document. The possibility is additionally given to the user to edit the stored texts and data from his mobile device 11 or PC 6 and to classify or subdivide them as he wishes. He can thus insert at a later stage additional metadata $M_1$, $M_2$, $M_3$ in the file 7 that will increase searchability.

It is useful for the mobile device 11 to switch into a sleep mode and not to make any recording of surrounding information if no useful wanted signal is received. This can be during the night when the user 1 sleeps if only incomprehensible noise is being recorded or if the user gives an explicit command to this effect. In this manner, it is possible not only to reduce the energy consumption but also to drastically reduce the quantity of data 7 that are sent to the remote server 4 and stored there. The mobile device 11 comprises however a circuit that will start a new recording if a useful audio signal is received.

For the sleep mode, there are different possibilities. The mobile device 11 can record, convert digitally and analyze all external noises. If these are not recognized by the mobile device 11 as being meaningful, they are not forwarded to the remote server 4. It is also conceivable that the mobile device 11 records all noises and if they are recognized as being meaningless before the digital conversion, the device 11 switches to the sleep mode. Several of these sleep modes can be used in the same mobile device, e.g. consecutively or as a reaction to different conditions.

The sleep mode of the recording function can be independent of the sleep mode of the mobile device 11. This means that the mobile device 11 can be switched off and a recording can be started if a noise is recorded.

Switching to a sleep mode or awakening from the sleep mode can also depend on different factors. By way of example, one will mention here that it can be initiated automatically by a noise, or depending on said events, or by the user, or automatically periodically or by the remote server 4. Events $e_1$, $e_2$, $e_3$ can also be transmitted to the remote server 4 if the mobile device 11 is in sleep mode.

In all mentioned embodiments, the user 1 has the possibility of indicating in a user profile the settings he desires in relation to the storage of the data. The user can also provide different texts, data or portions within the file 7 marked with special metadata $M_1$, $M_2$, $M_3$ with different access rights for different persons or groups. In this manner, the user can selectively give his family, his friends or his work colleagues the authorization to access the stored data. These persons can log into the remote server in the same manner as the user 1: through a mobile device 11 over a mobile radio network 3 or through a computer 6 and the Internet 5. An access on the documents in the remote server 4 is thus also always possible even if the user has lost his mobile device 11 or if it has been damaged. Some documents or text portions within the file 7 can also be marked as secret or only accessible to the user 1 so that no other persons but the user 1 himself can access these documents.

For the search, different possibilities are available according to the invention. The user can activate a search engine with the mobile device 11 or the computer 6 and search the documents in his memory area on the basis of keywords. Keywords allow not only the contents of the stored documents to be searched but also said metadata $M_1$, $M_2$, $M_3$ that characterize these data. The search engine will preferably be operated by the operator of the server and indexes only the documents in this server. A user can only search for documents that are contained in his personal memory area or at least for documents for which he has reading access rights.

The search engine can also have a voice-controlled menu. This possibility offers itself in particular if a voice channel is available that can be used by the user 1. Access to the data can occur manually at a point in time chosen by the user when he searches for a particular item of information. An automatic or semi-automatic access can also be provided. In this case, an alarm function could remind the user about a deadline or it could be a criteria (e.g. location or event) preset by the user. This access can be indicated by the user for example in the user options. In a further embodiment, access to the data can also occur over the network-based voice message box 43.

The data of a calendar program such as Outlook can be stored in the remote server 4 resp. the remote server 4 can be synchronized with a calendar program such as Outlook. As long as the location of the recorded documents is known, they can be processed geographically and represented on a map and questions such as "What conversation did I record in Kreuzberg? Where is my Ka-We-De receipt? How expensive was the coffee in Venice?" can be answered more easily with the aid of the map. The program for such calendars or geographic applications can be executed in the mobile device 3, in a computer of the user and/or in the remote server 4.

From the mobile device 11, the user 1 can access his data and browse through them over a voice-controlled menu, over a WAP function, by sending an SMS etc. The results can be received as text (WAP, SMS, USSD, etc.) and displayed to the user. If an audio file is available, the user 1 can play this original file with the originally recorded information. A text file can also be synthesized with the voice of the user or another, possibly known or famous voice. Use of a computer 6 will give additional possibilities. The user can access a search result over an Internet site or it can be sent to him as e-mail. In principle, the data can be represented here too as text or (if available) as audio file.

Use of the personal memory area 42 for storing the file 7 can be billed to the user by a service provider. The manner in which the costs are billed can differ. One possibility consists in a comprehensive fee for using the service, e.g. as part of his monthly subscription for the mobile device 11. A billing according to the used memory space or only for the transmitted data volumes when storing or searching and playing back the data is conceivable. Depending on a user profile, according to one or several performed searches or depending on the contents of a stored text or of the stored data, it is possible in a further embodiment to send the user some advertising.

Besides the method, the invention also relates to a communication system and a mobile device with the characteristics of the independent device claims.

LIST OF REFERENCES

1 User
11 Mobile radio device
12 Identification module
13 Voice recognition system
14 Sensor
3 Communication network
4 Remote server 41 Voice recognition system
42 Memory area
43 Voice message box of the user 1
5 Internet
6 Computer, Internet terminal
7 File
$e_1, e_2, e_3$ Events
$M_1, M_2, M_3$ Metadata

What is claimed is:

1. Method for continuously recording surrounding information by a mobile device with the following method steps:
the mobile device of a user continuously recording surrounding audio information and sending resulting data to a remote server, wherein:
the data is classified and/or indexed automatically by the remote server such that said classification and/or indexing is determined in an automated manner depending on the content of the data and/or on metadata that are generated from external events in relation to the mobile device and/or by the user,
the classified and/or indexed data is formatted and stored to be electronically searchable by the user accessing said remote server from a remote location, and
the mobile device records the data and if the data is recognized as being meaningless before the digital conversion, the mobile device switches to a sleep mode.

2. The method of claim 1, wherein, from the recorded information, one or a plurality of files are generated in the mobile device or in the remote server.

3. The method of claim 2, further comprising the step of associating the metadata temporally with the file generated or derived therefrom, according to the external events or this file is subdivided through the metadata in such a manner that the file can be searched according to the associated metadata.

4. The method of claim 2, wherein the mobile device is connected to a mobile radio network and all recorded surrounding information is sent to a remote server and said file is stored there together with the metadata in a memory area allocated to the user.

5. The method of claim 1, wherein the external events are recorded automatically, are preprogrammed and/or are set individually by the user.

6. The method of claim 1, wherein the content of the data and the external events include the location or changes of the location of the mobile device, features in the room, data, time, events within the mobile device or data from sensors connected to the mobile device, predetermined noises within the file that are to be detected in the vicinity and/or recorded conversations or interlocutors of the user.

7. The method of claim 1, wherein the mobile device is in the sleep mode if no useful wanted signals is received.

8. The method of claim 1, wherein the mobile device records, converts digitally and analyzes all data and if these are not recognized as meaningful, they are not transmitted to the remote server.

9. The method of claim 1, wherein the sleep mode of the recording function is independent of the sleep mode of the mobile device.

10. The method of claim 1, wherein switching to the sleep mode or awakening from the sleep mode can be initiated automatically by a noise or an image, or automatically depending on said events, or by the user, or automatically periodically or by the remote server.

11. The method of claim 1, wherein events can also be transmitted by the mobile device to the remote server when the mobile device is in the sleep mode.

12. The method of claim 1, further comprising the step of local buffering of received signals or file parts in the memory of the mobile device before transmission to the remote server takes place.

13. The method of claim 1, wherein a voice recognition system converts the recorded data into a text file and the metadata are associated temporally to the generated text file according to the external events.

14. The method of claim 1, wherein a voice recognition system converts the recorded data into a text file and recognizes different conversation parts of a conversation and the participation of at least one interlocutor is used as metadata.

15. The method of claim 13, wherein the used voice recognition system uses user-dependent language models.

16. The method of claim 13, wherein new language models are established through new conversations for the individual interlocutors.

17. The method of claim 13, wherein the voice recognition occurs locally in the mobile device or in the remote server.

18. The method of claim 13, wherein the recorded data and/or the text file are stored.

19. The method of claim 1, wherein the audio, video or text data transmitted to the remote server are signed by means of a certificate by the mobile device in order to guarantee the authenticity of the data.

20. The method of claim 1, wherein the user adds further data to said recorded data.

21. The method of claim 1, wherein the recorded data are marked by the user at a later stage after the recording with metadata.

22. The method of claim 1, wherein different persons have access rights to different parts of the data that are marked with certain metadata.

23. The method of claim 1, wherein the user has access to the recorded data from his mobile device, over an Internet site or over a calendar program and searches these data according to contents or according to metadata.

24. The method of claim 1, wherein the search is performed over a voice command.

25. The method of claim 1, wherein a program or applet is provided on the mobile device that performs the continuous recording and the processing of the recorded data.

26. The method of claim 1, wherein a service provider offers a user of a mobile device for performing said method and bills a corresponding service to the user.

27. The method of claim 1, wherein a video recording is made permanently by the mobile device or by a device connected to the mobile device and the data are also sent to the remote server.

28. The method of claim 1, wherein the subdividing and/or indexing of the recorded data occurs through conversion into a markup language file, which performs a subdivision in different files, where each file is connected with metadata or by adding a marked index in an audio file.

29. The method of claim 1, wherein the search results are reproduced as text or as synthetic voice.

30. The method of claim 1, wherein said resulting data is buffered during or prior to said sending, with said sending step including streaming said resulting data to the remote server.

31. The method of claim 1, wherein said surrounding information is sound that is recorded by said mobile device.

32. Communication system including:
a mobile device for continuously recording surrounding information and streaming resulting data to a remote server, wherein the mobile device records the data and if the data is recognized as being meaningless before the digital conversion, the mobile device switches to a sleep mode, means for automatically classifying and/or indexing the data, said classifying and/or indexing performed automatically depending on the content of the data and/or on metadata that are generated from external events in relation to the mobile device and/or by the user, and means for the user remotely searching the classified and/or indexed data, wherein the classified and/or indexed data is formatted and stored.

33. The communication system of claim 32, characterized by means in the mobile device or in the remote server for generating from the recorded data one or a plurality of files.

34. The communication system of claim 33, characterized by means for temporally associating the metadata with the file generated or derived therefrom, according to the external events or for subdividing this file through the metadata in such a manner that the file can be searched according to the associated metadata.

35. The communication system of claim 32, wherein the mobile device is a mobile connected to a mobile radio network and a remote server is connected to the mobile radio network and said data can be stored in the remote server together with the metadata in a memory area allocated to the user.

36. The communication system of claim 32, characterized by a voice recognition system that converts the recorded data into a text file, means being provided for temporally associating the metadata with the generated text file according to the external event.

37. The communication system of claim 32, wherein the used voice recognition system uses user-dependent language models.

38. The communication system of claim 32, characterized by access rights for different people to different portions of the data that are marked with certain metadata.

39. Method for continuously recording surrounding information using a server connected to a mobile device:

the server receiving, via a communication network from a remote location, recorded data from a mobile device that is continuously recording surrounding information and streaming resulting data to the server, wherein the mobile device records the data and if the data is recognized as being meaningless before the digital conversion, the mobile device switches to a sleep mode, the server automatically classifying and/or indexing the recorded data in an automated manner based on the content of the recorded data and/or based on metadata received by the server that are generated from external events in relation to the mobile device and/or by the user; and the server providing a capability to a user located remotely from the server to search the classified and/or indexed data via a connection with the mobile device connected to said server or another device connected to said server.

40. Method for continuously recording surrounding information using a server connected to a mobile device:

the server receiving, via a communication network from a remote location, recorded data from a mobile device of a user that is continuously recording information surrounding the user and streaming resulting data to the server, wherein the mobile device records the data and if the data is recognized as being meaningless before the digital conversion, the mobile device switches to a sleep mode, the server automatically classifying and/or indexing the recorded data in an automated manner based on the content of the recorded data and/or based on metadata received by the server that are generated from external events in relation to the mobile device and/or by the user; and the server providing a capability to the user located remotely from the server to search the classified and/or indexed data via a connection with the mobile device connected to said server, wherein such search is based on the content of the recorded data and/or based on metadata.

* * * * *

UNITED STATES PATENT AND TRADEMARK OFFICE
CERTIFICATE OF CORRECTION

| | | |
|---|---|---|
| PATENT NO. | : 8,571,529 B2 | Page 1 of 1 |
| APPLICATION NO. | : 11/848519 | |
| DATED | : October 29, 2013 | |
| INVENTOR(S) | : Eric Lauper | |

It is certified that error appears in the above-identified patent and that said Letters Patent is hereby corrected as shown below:

Title Page, item [54] and in the Specifications, column 1, Title, delete "sounding" and insert -- surrounding -- therefor.

Signed and Sealed this
Eleventh Day of March, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,571,529 B2
APPLICATION NO. : 11/848519
DATED            : October 29, 2013
INVENTOR(S)      : Eric Lauper It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1226 days.

Signed and Sealed this

Twenty-third Day of May, 2017

Michelle K. Lee
*Director of the United States Patent and Trademark Office*